United States Patent [19]

Shimizu et al.

[11] Patent Number: 4,852,264
[45] Date of Patent: Aug. 1, 1989

[54] DISTANCE MEASURING DEVICE WITH TRANSMITTER

[75] Inventors: Giichiro Shimizu; Toshiharu Okuyama; Yoshio Wakatsuki, all of Tokyo, Japan

[73] Assignee: Man Design Co., Ltd., Tokyo, Japan

[21] Appl. No.: 223,361

[22] Filed: Jul. 25, 1988

[30] Foreign Application Priority Data

Jul. 31, 1987 [JP] Japan ................................ 62-191625

[51] Int. Cl.⁴ .............................................. G01B 7/02
[52] U.S. Cl. .................................................... 33/832
[58] Field of Search ................. 33/172 E, 172 R, 558, 33/561, 169 R

[56] References Cited

U.S. PATENT DOCUMENTS

| 4,130,941 | 12/1978 | Amsbury | 33/172 E X |
| 4,160,971 | 7/1979 | Jones et al. | |
| 4,289,382 | 9/1981 | Clark | 33/172 E X |
| 4,437,240 | 3/1984 | Joengel | 33/172 E |

FOREIGN PATENT DOCUMENTS

| 2221371 | 4/1976 | Fed. Rep. of Germany . |
| 3410292A1 | 9/1985 | Fed. Rep. of Germany . |
| 0190208 | 11/1980 | Japan ................................ 33/172 E |

Primary Examiner—Harry N. Haroian
Attorney, Agent, or Firm—Nixon & Vanderhye

[57] ABSTRACT

An oscillator oscillates at a frequency determined by the distance moved by a probe. The probe in contact with an object under measurement, moves according to the displacement of the object. A controller computes the distance moved by the probe from a reference position at predetermined time intervals by using the shift of the oscillating frequency of the oscillator. The controller further decides if the computed distances are within a predetermined range. If the computed distances moved are within that range, the controller supplies the computed distance moved to a transmitter, which in turn wirelessly transmits the distance. When the computed distance moved is outside the predetermined range, the controller does not output the distance moved to the transmitter, nor does it supply the distance moved every four computations of the distance moved.

5 Claims, 5 Drawing Sheets

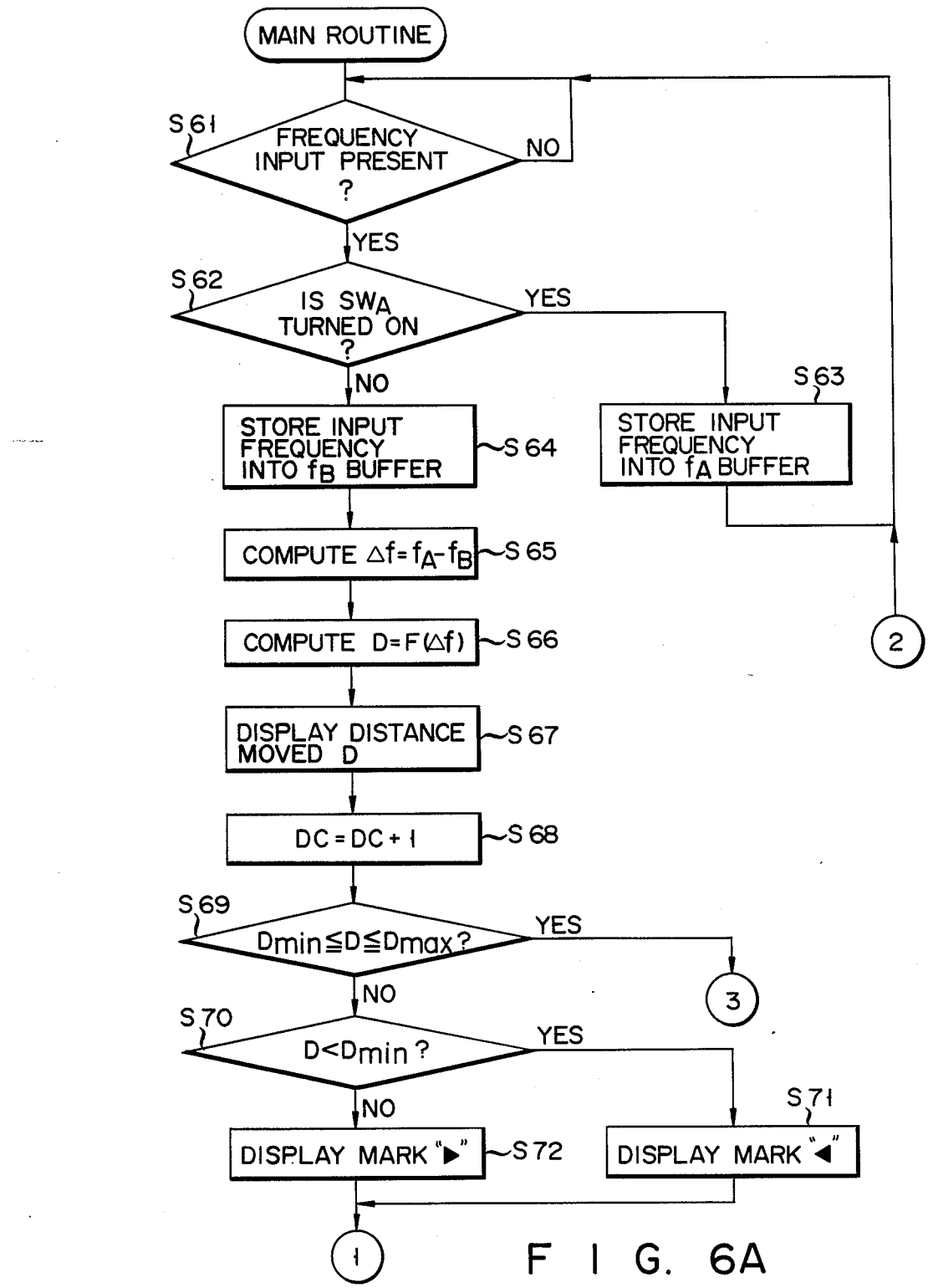
F I G. 6A

DISTANCE MEASURING DEVICE WITH TRANSMITTER

BACKGROUND OF THE INVENTION

1. Field of the Invention

This invention relates to a distance measuring device having a transmitter which detects the distance moved by a probe in contact with an object under measurement; the device transmits data representing the distance moved to an external device. More particularly, this invention relates to a distance measuring device with a transmitter characterized by the reducing the power consumption of the transmitter.

2. Description of the Related Art

There have been known various types of distance measuring devices for measuring a minute displacement of an object to be measured. A typical example is a dial gauge of the manually operated portable type. The dial gauge is capable of precisely measuring the displacement of an object up to 0.1 mm or 0.001 mm. Some dial gauges can display the distance of the probe displaced from a reference position in terms of digital figures. In this type of distance measuring device, a core member is coupled with a shaft for supporting the probe. A couple of coils are wound around the core member. These coils are incorporated into a Colpitts oscillator. When the probe is moved, the core member also moves within the couple of coils. The movement causes an oscillating frequency of the oscillator to shift from its reference frequency. This frequency shift is detected. A computing system contained in the measuring device computes the distance moved by the core member, or that by the probe, by using the detected frequency shift. Specifically, an oscillating frequency of the oscillator is counted by a counter, and converted into corresponding digital frequency data. The data obtained is supplied to a controller such as a microcomputer. The microcomputer computes the distance moved by the probe by using the frequency shift represented by that data. The computed data is applied to display, and is digitally displayed.

In the distance measuring device, the exact data cannot be obtained over the entire range of the probe movement, but can be obtained within a specific or effective range of the probe movement.

Another type of distance measuring device is designed with the intention to improve the data processing efficiency of the distance as measured by the manually-operated portable measuring device. In the device, a micro transmitter is built into the distance measuring device of the manually-operated portable type, and the transmitter wirelessly transmits the measured distance to an external host system. The proposed measuring device has a miniature battery assembled thereinto. The battery is for supplying electric power to drive an oscillator, a counter, a controller, a display, the transmitter, and the like. In operation, a power switch is turned on, and those related components are driven. The measuring device computes the distance moved by the probe from a reference position at fixed time intervals, e.g., 0.1 sec., and wirelessly transmits the measured data to the host system. In some such measuring devices, no power switches are used for cost reduction purposes. When loaded with a battery, the device automatically starts and continues the wireless transmission of the moved distance at fixed time intervals.

Most of the electric power is consumed by the transmitter, while the electric power consumed by the remaining circuit components is negligibly small. Even if the electric power is constantly supplied to those remaining components, reduction of the lifetime of battery is of an insignificant degree.

The transmitter output power must be kept at a value exceeding a predetermined value, because the measuring device will frequently encounter a situation where it must transmit the measured data to a distant host system. In such a case, the power consumption by the transmitter considerably increases. Therefore, the battery power is rapidly consumed, and hence its lifetime reduction is considerable.

SUMMARY OF THE INVENTION

Accordingly, an object of this invention is to provide a distance measuring device which can hold back the consumption of the battery power to ensure long use of the battery.

According to this invention, there is a distance measuring device with a transmitter comprising probe means in contact with an object under measurement and movable according to the displacement of the object, core member means coupled with the probe means, oscillating means having a plurality of coils in which the core member means is slidably inserted which oscillates at a frequency determined by the distance moved by the core member means within the coils, means for computing the distance moved by the probe means from a reference position at first time intervals by using a shift of the oscillating frequency of the oscillating means, means for deciding if the distances moved computed by the computing means are within a predetermined range, means for continuously outputting the distances moved as computed at the first time intervals by the computing means immediately after the deciding means decides that the computed distances moved are within the predetermined range, means for stopping the continuous output of the computed distances moved by the continuous output means when the deciding means decides that the computed distances moved are not within the predetermined range, and means for wirelessly transmitting the distance moved output from the continuous output means.

BRIEF DESCRIPTION OF THE DRAWINGS

FIGS. 6A and 6B cooperate to show a flowchart for explaining the operation of the controller when it computes the distance moved by the probe;

DETAILED DESCRIPTION OF THE PREFERRED EMBODIMENTS

An embodiment of a distance measuring device with a transmitter according to this invention will be described referring to the accompanying drawings.

Figure 1:
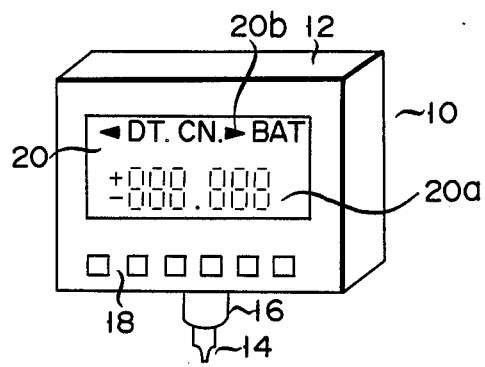
FIG. 1 shows a perspective view of a distance measuring device with a transmitter according to an embodiment of this invention.

The appearance of a distance measuring device with a transmitter according to a preferred embodiment of this invention is illustrated in FIG. 1. As is shown, measuring device 10 has a frame 12 shaped like a substantially rectangular parallelepipedon. Probe 14 is vertically and moveably suspended from the bottom of frame 12 through guide shaft 16. A number of function keys 18 are installed on the lower part of the front panel of frame 12. These function keys 18 are used for mode select, zero-adjustment, and the like. Display 20 is further installed on the middle to upper part of the front panel. The display 20 may be a liquid crystal display (LCD) panel. The panel of display 20 includes numerical display section 20a and mark display section 20b. Display section 20a contains six-digit figures for digitally displaying moved distance D of the probe. Display section 20b displays various types of marks. For example, the mark "◀" represents that the probe has moved beyond the lower limit of an effective or specific range ($D_{min}$ to $D_{max}$) of its movement. The mark "▶" represents that the probe has moved beyond the upper limit, and the "BAT" mark represents that the battery voltage has dropped below a predetermined level.

Figure 2:
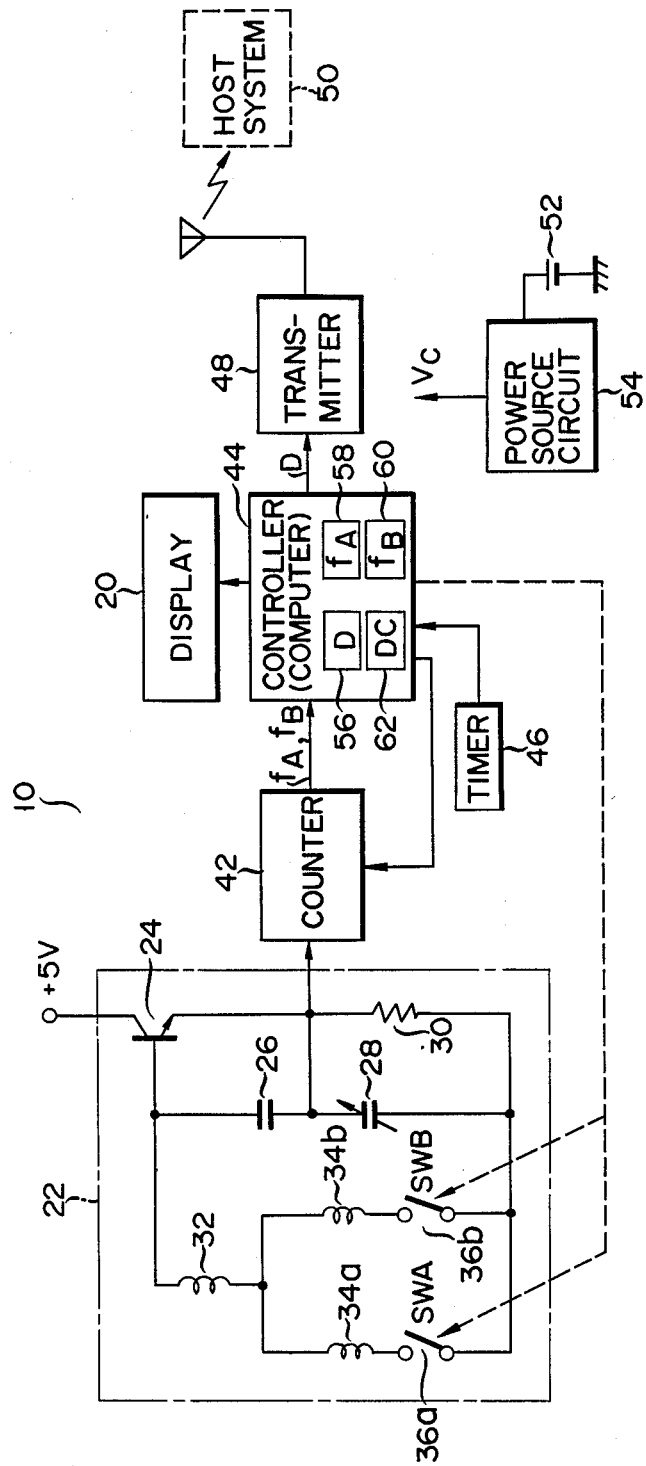
FIG. 2 shows a schematic diagram of a circuit arrangement of the measuring device of FIG. 1.

A circuit arrangement of the distance measuring device 10 with a transmitter is shown in FIG. 2. Measuring device 10 contains known Colpitts oscillator 22. Oscillator 22 further contains transistor 24. Capacitors 26 and 28, and resistor 30 are connected between the base and emitter of transistor 24, as is shown. The base is connected to one end of the primary coil 32. Two series circuits exist, one including the secondary coil 34a and switch 36a (SWA) and the other including another secondary coil 34b and switch 36b (SWB). These series circuits are connected in parallel. One end of the parallel circuit is connected to the other end of the primary coil 32. The other end of the parallel circuit is connected to a node of capacitor 28 and resistor 30. The impedance values of the secondary coils 34a and 34b are equal.

Figure 3:
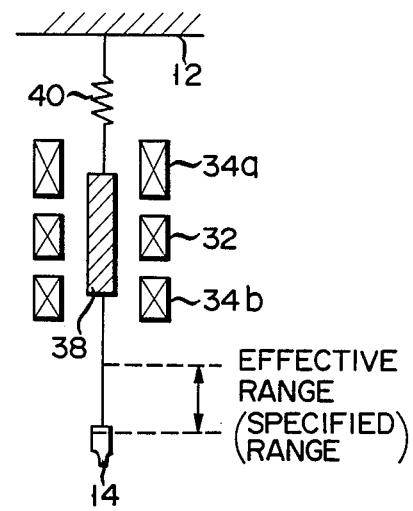
FIG. 3 shows a sectional view of the probe assembly of the measuring device of FIG. 1, explaining the physical layout of the coils and the core member.

A physical layout of the primary and secondary coils 32, 34a, and 34b, and core member 38 are shown in FIG. 3. The secondary coil 34a is located above the primary coil 32, while the secondary coil 34b is below the primary coil 32. Core member 38, secured to the shaft of probe 14, is slidably placed in those coils 32, 34a, and 34b. The shaft of probe 14 is secured to one end of spring 40. Spring 40 is fixed to the top of frame 12. When probe 14 is moved up, core member 38 moves toward secondary coil 34a. The result is a tight coupling of the primary coil 32 and secondary coil 34a. When probe 14 is moved down, core member 38 moves toward secondary coil 34b. The result is a tight coupling of the primary coil 32 and secondary coil 34b.

Figure 4:
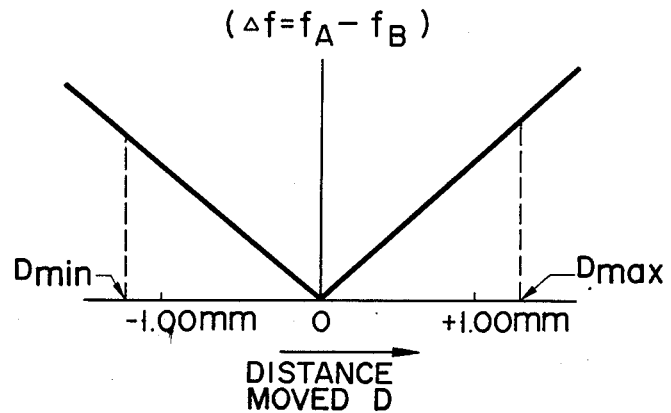
FIG. 4 shows a graph illustrating the relationship between a frequency shift and a distance moved.

In the Colpitts oscillator 22 thus arranged, when the center of core member 38 is substantially level with the primary coil 32, oscillating frequency $f_A$ of the oscillator, when switch 36a is closed, is equal to that of $f_B$ when switch 36b is closed. The position of probe 14 at that level is referred to as a reference position. When probe 14 moves up or down to depart from this position, these frequencies $f_A$ and $f_B$ become unequal, causing a difference between them. This frequency difference $\Delta f$ ($=f_A-f_B$) amounts to the distance of core member 38 from a reference position, viz., the distance moved by probe 14. Distance moved D substantially and linearly varies with respect to frequency difference $\Delta f$, as is shown in FIG. 4.

Each frequency $f_A$ and $f_B$ of oscillator 22 is counted and digitized by counter 42. The digitized data of frequency $f_A$ or $f_B$ is input to controller 44. Controller 44 is constituted by a microcomputer, for example, which contains input/output ports, ROM, RAM, and the like. Controller 44 alternately turns on and off switches 36a and 36b of oscillator 22 in response to receiving time interrupt signals from timer 46 at time intervals $T_0$, while at the same time computing distance moved D by probe 14 by using oscillator frequencies $f_A$ and $f_B$. Controller 44 applies the computed results to display 20 for their visual presentation, and incorporates them into transmission data format, which in turn is supplied to transmitter 48.

Transmitter 48 frequency modulates (more precisely FSK (frequency shift keying) modulates the transmission data format containing the distance moved D) and wirelessly transmits the same. A receiver (not shown) of host system 50 receives the transmitted data, and demodulates it into the original digital data of distance.

In frame 12, distance measuring device 10 further contains power source 52 as a battery and power source circuit 54 for transforming the battery voltage into the voltages $V_C$ necessary for driving the related circuit components.

The ROM of controller 44 contains conversion memory 56, which stores a conversion formula "$D=F(\Delta f)$" for converting frequency difference $\Delta f(=f_A-f_B)$ shown in FIG. 4 into distance moved D by probe 14 from the reference position. The RAM of controller 44 contains $f_A$ buffer 58, $f_B$ buffer 60, data frequency counter 62, and the like. Buffers 58 and 60 temporarily store frequency data $f_A$ and $f_B$, respectively. Counter 62 counts the number DC of the computations of distance moved D.

Figure 5:
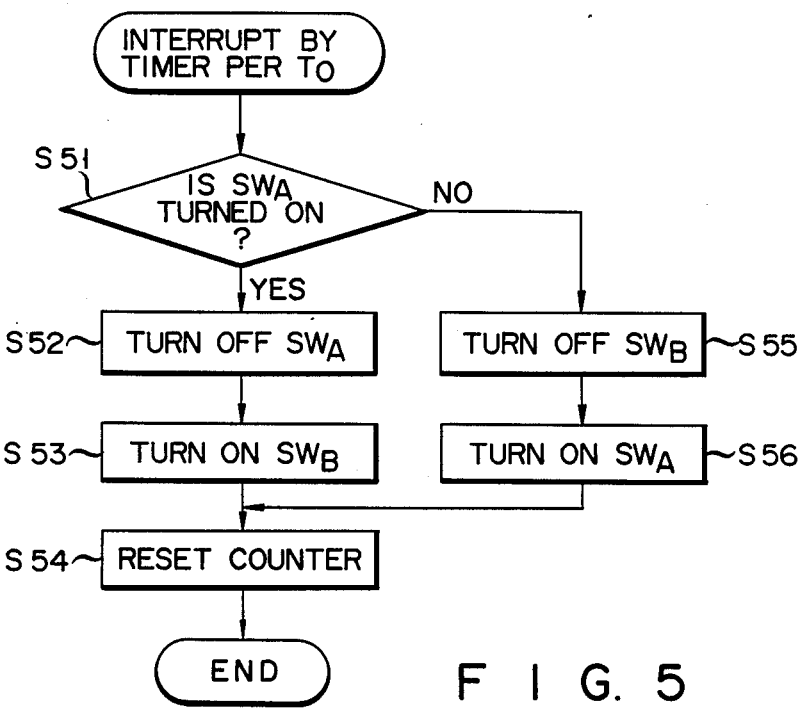
FIG. 5 shows a flowchart for explaining the time interrupt operation of a controller used in the measuring device of FIG. 1.

In measuring device 10 thus arranged, when receiving time interrupt signals from timer 46 at time intervals $T_0$, controller 44 executes time interrupt processing as charted in FIG. 5. In response to an interrupt signal from timer 46, controller 44 checks if switch 36a (SWA) of oscillator 22 is turned on or off (step S51). If SWA is turned on, controller 44 turns off SWA (step S52) and turns on switch 36b (SWB) (step S53). Then, controller 44 resets counter 42 (step S54).

As a result, the oscillating frequency of oscillator 22 changes from $f_A$ to $f_B$. Counter 42 completes the count operation of frequency $f_B$ after a time period elapsed from the count start which is shorter than period or time interval T0, and outputs the counted frequency $f_B$.

If in step S51, controller 44 decides that switch 36a or SWA is turned off, controller 44 turns on switch 36b or SWB (step S55), and turns on switch 36a (SWA) (step S56). Subsequently, controller 44 resets counter 42 (step S54). Then, counter 42 starts its counting operation of frequency $f_A$.

Figure 6B:
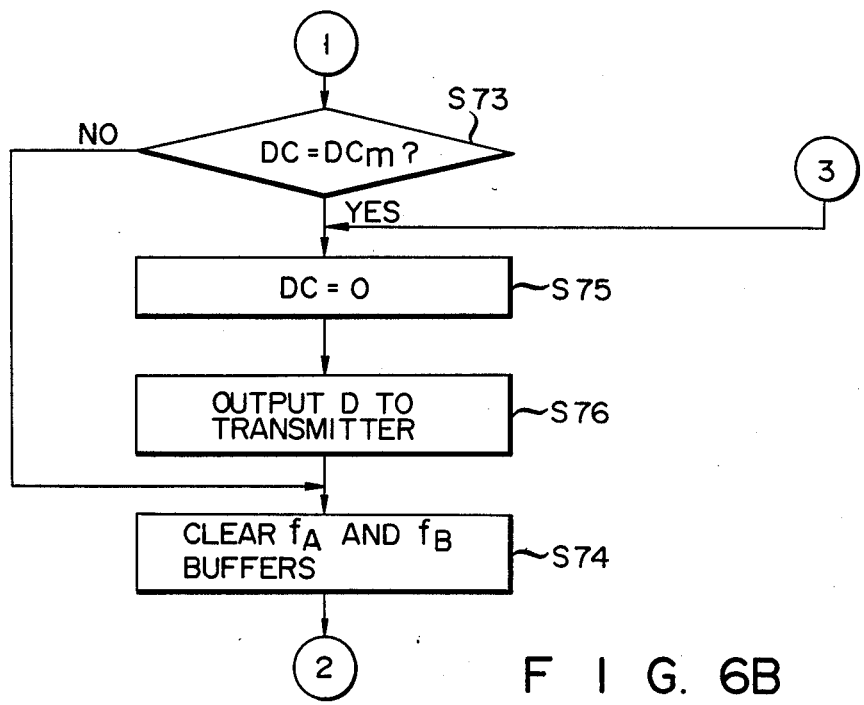

Controller 44 further computes moved distance D of probe 14. A main routine for this may be charted as is shown in FIGS. 6A and 6B. Controller 44 executes various initial processings, and waits for the frequency data from counter 42 (step S61). When receiving the frequency data, controller 44 checks the type of the frequency data on the basis of the state, i.e., on or off, of switch 36a (SWA) in oscillator 22 (step S62). If the switch 36a (SWA) is turned on, controller 44 decides that the input frequency is $f_A$, and stores this frequency into $f_A$ buffer 58 (step S63). Then, controller 44 returns to step S61, and waits for the next frequency data. If in step S62, the decided frequency is $f_B$, it is stored into $f_B$ buffer 60 (step S64). Following this, controller 44 reads out the frequency data $f_A$ and $f_B$ from buffers 58 and 60, and computes the difference between them, viz., executes $\Delta f = f_A - f_B$ (step S65). Further, controller 44 reads out conversion formula $D = F(\Delta f)$ from memory 56, and computes distance moved D by using the formula (step S66). Controller 44 supplies the computed distance moved D to display 20. The controller causes display 20 to display it in numerical display section 20a (step S67). Then, it increments count DC of counter 62 by "1" (step S68).

In step S69, controller 44 checks if the distance moved D computed in step S66 is within an effective range $D_{max}$ to $D_{min}$. If the answer is NO indicating that distance moved D is outside the effective range, controller 44 checks if distance moved D is below the lower limit $D_{min}$ (step S70). Controller 44 knows if distance moved D is below or above the effective range from the check of step S70. When distance moved D exists below the effective range, mark "◀" is displayed in mark display section 20b of display 20 (step S71). When it is above the effective range, mark "▼" is displayed (step S72).

Then, controller 44 checks if count DC by counter 62, which was incremented by one in step S68, reaches preset value $DC_m$ (in this instance, $DC_m = 5$) (step 73). If the answer is NO, controller 44 clears $f_A$ and $f_B$ buffers 58 and 60 (step S74), returns to step S61, and waits for the next frequency data.

As distances moved D out of the effective range are progressively computed in this way, count DC of counter 62 is also incremented one by one. In step S73, controller 44 checks if incremented count DC reaches preset value $DC_m$. If the answer is YES, viz., $DC = DC_m$, controller 44 clears count DC of counter 62 to zero (step S75). Then, controller 44 incorporates computed distance moved D into a transmission format, and supplies it to transmitter 48 (step S76). In turn, transmitter 48 transmits distance moved D in a wireless manner. Controller 44 goes to step S74, and clears the contents of $f_A$ and $f_B$ buffers 58 and 60. Then, controller 44 returns to step S61 and waits for the next frequency data. When computed distance moved D is not within the effective range, distance moved D is output to transmitter 48 intermittently, every four computations in this instance.

If in step S69, controller 44 decides that computed distance moved D is within the effective range, controller 44 goes to step S75 and clears count DC of counter 62 to "0". Further, controller 44 formats computed data D for its transmission, and supplies the formatted data to transmitter 48 (step S76). Thus, the distance moved D within the effective range is straightforwardly output to transmitter 48.

Figure 7:
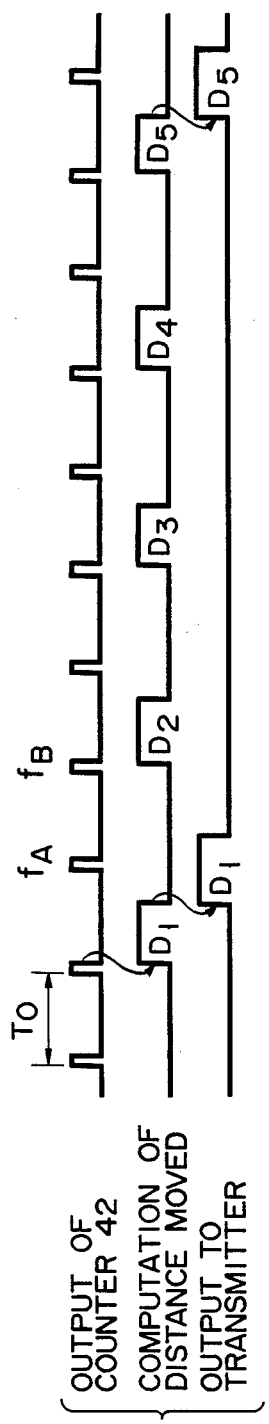
FIG. 7 shows a timing chart explaining the operation of the measuring device of FIG. 1 when the moved distance of the probe is outside an effective range of probe movement.
Figure 8:
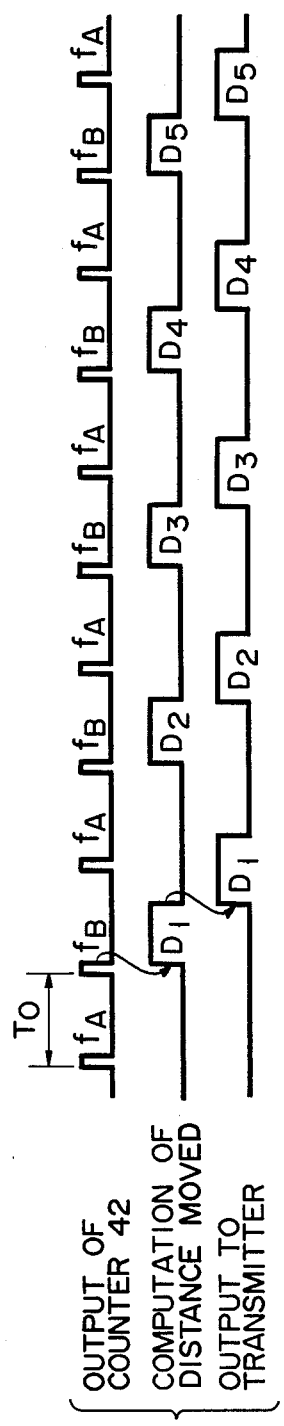
FIG. 8 shows a timing chart for explaining the operation of the measuring device of FIG. 1 when the moved distance of the prove is within the effective range.

When distance measuring device with a transmitter is thus arranged and operated as normally operated, the oscillator provides alternately frequency $f_A$ and $f_B$. The data signal output from counter 42 is pulsed at time intervals $T_O$ as shown in FIGS. 7 and 8. Controller 44 computes distance moved D every $2T_O$.

When probe 14 is not in contact with an object to be measured, it is pushed down by spring 40 and is placed at the lowest position. In this condition, distance moved D by probe 14 is below the effective range $D_{min}$ to $D_{max}$. Therefore, it is only one of four distances successively computed every $2T_0$ by controller 44 that is output to transmitter 48, as is shown in FIG. 7.

When probe 14 is contact with the object, it is pushed up and enters the effective range. In this condition, distances moved D computed every $2T_0$ are straightforwardly output to transmitter 48, as is shown in FIG. 8.

When distance moved D is outside the effective range, distance moved D computed every $2T_0$ is intermittently output to transmitter 48. This implifies that useless data transmission by transmitter 48 may be reduced remarkably. As a result, the power consumption by transmitter 48 can be held back, leading to a remarkable elongation of the lifetime of battery 52.

Even if the measured distance moved D by probe 14 is outside the effective range, transmission of the computed distances moved is not stopped, but intermittently performed. The intermittently transmitted data could be used when one desired to roughly know the distance moved by the probe.

In the above-mentioned embodiment, when distance moved D is outside the effective range, computed distances moved D are intermittently transmitted. If necessary, no computed distance moved D may be transmitted. In this modification, it is only the distance moved D within the effective range that is transmitted from transmitter 48. Further power saving may thus be attained.

As seen from the foregoing description, in the distance measuring device according to this invention, the transmission of the measured and computed distance moved which is outside the effective range is not continuous but intermittent. Therefore, the consumption by the transmitter may be remarkably small and hence a long lifetime of the contained battery may be ensured.

While a specific embodiment of this invention has been described, it should be understood that this invention is not limited to this embodiment, but may be otherwise variously embodied within the scope of this invention.

What is claimed is:

1. A distance measuring device with a transmitter comprising:
   probe means in contact with an object under measurement and movable according to the displacement of the object;
   core member means coupled with said probe means;
   oscillating means having a plurality of coils in which said core member means is slidably inserted which oscillates at a frequency determined by the distance moved by said core member means within said coils;
   means for computing the distance moved by said probe means from a reference position at first time intervals by using a shift of the oscillating frequency of said oscillating means;
   means for deciding if the distances moved computed by said computing means are within a predetermined range;
   means for continuously outputting the distances moved as computed at said first time intervals by said computing means immediately after said deciding means decides that the computed distances moved are within the predetermined range;

means for stopping the continuous output of the computed distances moved by said continuous output means when said deciding means decides that the computed distances moved are not within the predetermined range; and means for wirelessly transmitting the distance moved output from said continuous output means.

2. The distance measuring device according to claim 1, further comprising means which, when said stop means stops the continuous output of the distance moved by said continuous output means, intermittently outputs the distance moved computed at said first time intervals by said computing means to said transmitting means.

3. The distance measuring device according to claim 2, in which said intermittent output means outputs the computed distances moved every four computations to said transmitting means.

4. The distance measuring device according to claim 1, further comprising means which, when said stop means stops the continuous output of the distance moved by said continuous output means, intermittently outputs the distance moved as computed at second intervals longer than said first time interval by said computing means to said transmitting means.

5. The distance measuring device according to claim 4, in which said second time interval is an integer times said first time interval.

* * * * *